United States Patent [19]

Borenstein

[11] Patent Number: 5,687,136
[45] Date of Patent: Nov. 11, 1997

[54] USER-DRIVEN ACTIVE GUIDANCE SYSTEM

[75] Inventor: Johann Borenstein, Ann Arbor, Mich.

[73] Assignee: The Regents of the University of Michigan, Ann Arbor, Mich.

[21] Appl. No.: 627,646

[22] Filed: Apr. 4, 1996

[51] Int. Cl.[6] .................................................. G01S 15/88
[52] U.S. Cl. ............................ 367/116; 367/96; 367/910
[58] Field of Search .................................. 367/87, 93, 95, 367/96, 99, 116, 910; 135/911

[56] References Cited

U.S. PATENT DOCUMENTS

| | | | |
|---|---|---|---|
| 4,103,278 | 7/1978 | Satake et al. | 367/107 |
| 4,280,204 | 7/1981 | Elchinger | 367/116 |
| 4,658,385 | 4/1987 | Tsuji | 367/105 |
| 4,680,740 | 7/1987 | Treptow | 367/101 |
| 4,761,770 | 8/1988 | Kim et al. | 367/116 |
| 5,006,988 | 4/1991 | Borenstein et al. | 364/424.02 |
| 5,097,856 | 3/1992 | Chi-Sheng | 135/72 |
| 5,239,515 | 8/1993 | Borenstein et al. | 367/87 |

OTHER PUBLICATIONS

Benjamin, J.M., Ali, N.A., and Schepis, A.F., 1973, "A Laser Cane for the Blind." *Proceedings of the San Diego Biomedical Symposium*, vol. 12, pp. 53–57.

Bissitt, D. and Heyes, A.D., 1980, "An Application of Biofeedback in the Rehabilitation of the Blind." *Applied Ergonomics*, vol. 11, No. 1, pp. 31–33.

Blasch, B.B., Long, R.G., and Griffin-Shirley, N., 1989, "National Evaluation of Electronic Travel Aids for Blind and Visually Impaired Individuals: Implications for Design." *RESNA 12th Annual Conference*, New Orleans, Louisiana, pp. 133–134.

Brabyn, J.A., 1982, "New Developments in Mobility and Orientation Aids for the Blind." *IEEE Transactions on Biomedical Engineering*, vol. BME–29, No. 4, pp. 285–289.

Clark–Carter, D.D., Heyes, A.D., and Howarth, C.I., 1986, "The Effect of Non–visual Preview Upon the Walking Speed of Visually Impared People." *Ergonomics*, vol. 29, No. 12, pp. 1575–1581.

Freeston, I.L., Callaghan, V.L., and Russell, N.D., 1984, "Portable Navigation Aid for the Blind." Frontiers of Engineering and Computing in Health Care–1984 Proceedings, Sixth Annual Conference—*IEEE Engineering in Medicine and Biology Society*. Los Angeles, California, Sep. 15–17, pp. 247–249.

Gilden, D., 1988, "Annual Report of Progress." *Report of the Rehabilitation Engineering Center of the Smith–Kettlewell Eye Research Institute*, San Francisco, California, pp. 23–24.

Kay, L., 1974, "A Sonar Aid to Enhance Spatial Perception of the Blind: Engineering Design and evaluation." *Radio and Electronic Engineer*, vol. 44, No. 11, pp. 605–627.

Kelly, G.W. and Ackerman, T., 1982, "Sona, the Sonic Orientation and Navigational Aid for the visually Impared." *5th Annual Conference on Rehabilitation Engineering*, Houston, TX. p. 72.

(List continued on next page.)

*Primary Examiner*—Ian J. Lobo
*Attorney, Agent, or Firm*—Harness, Dickey & Pierce, PLC

[57] ABSTRACT

A user-driven, active guidance system for guiding visually impaired users through obstacle filled routes of travel. The system includes an obstacle detection system, having an array of ultrasonic sensors, which detects the distance to and location of obstacles and a controller for receiving obstacle data and determining an optimal path around the obstacle so as to return the user back to the original path of travel without losing orientation or direction. The system provides active guidance by exerting physical force upon the user to intuitively direct the user around the obstacle. The system is driven by the user's motion and comprises a cane, as well as the ray of ultrasonic sensors and controller supported on a pair of guide wheels.

24 Claims, 4 Drawing Sheets

OTHER PUBLICATIONS

Kumpf, M., 1987, "A New Electronic Mobility Aid for the Blind–a Field Evaluation." *International Journal of Rehabilitation Research*, 1987; Supplement No. 5 to vol. 10, No. 44, pp. 298–301.

Lebedev, V.V. and Sheiman, V.L., 1980, "Assessment of the Possbilities of Building and Echo Locator for the Blind." *Telecommunications and Radio Engineering*, vol. 34–35, No. 3 pp. 97–100.

Milner, R.E. and Gilden, D., 1988, "Navigation Device for the Blind." *ICAART 88*, Montreal, Canada, pp. 214–215.

Shao, S., 1985, "Mobility Aids for the Blind." *Electronic Devices for Rehabilitation*, John Wiley & Sons, New York, New York, pp. 79–100.

Shoval et al, "Mobile Robot Obstacle Avoidance in a Computerized Travel Aid for the Blind," Proc. 1994 IEEE Int. Conf. on Robotics and Automation, San Diego May 8, 1994.

USER-DRIVEN ACTIVE GUIDANCE SYSTEM

FIELD OF THE INVENTION

The present invention relates to obstacle avoidance systems. More particularly, the present invention relates to user-driven, active guidance systems for guiding a user through a field of operation having obstacles.

BACKGROUND OF THE INVENTION

Travel aids have been developed to assist the visually impaired negotiate obstacle filled routes of travel. The most successful and widely used travel aid for the blind is the white cane. The white cane can be used to detect obstacles on the ground, uneven surfaces, holes, steps, and puddles. It is very inexpensive, and is so lightweight and small that it can be folded and tucked away in a pocket. Blind pedestrians usually tap their cane on the ground while walking and they listen to the resulting sound and vibrations that reveal the nature of the surface. The white cane is also very efficient in detecting both down-steps and up-steps. A very common example is the step at the edge of a sidewalk.

In order to use the white cane, the user must sweep the area of travel in order to detect obstacles. The foremost disadvantage of the white cane is its failure to detect obstacles outside of its reach. Such obstacles include branches, signs, or any other obstacle protruding into the path above the user's waist. Another major disadvantage of the white cane is that the user must be specifically trained to use it properly. Its use and operation requires significant effort and concentration on the part of the user and even the most proficient users must walk at a slower than normal pace when using the white cane. Furthermore, the white cane can merely detect obstacles, it does not provide any guidance information. Therefore, the user is required to randomly pick a path around the obstacle. This can lead to a loss of orientation and direction. Other disadvantages of the white cane include not being able to guide the user to a predetermined point or provide any position information in terms of an absolute or relative position from a starting point or destination point.

In the past three decades, several electronic travel aids (ETAs) have been introduced that are aimed at improving their blind users' mobility in terms of safety and speed. These devices may be classified into two categories: electronic travel aids that detect obstacles and global navigation aids that assist the blind traveler in navigating (i.e., knowing where one is).

A device based on optical triangulation, was introduced in the 1970's. It comprised a white cane having three laser diodes and three photodiodes as receivers. The device had an UP channel that detects obstacles at head-height and a FORWARD channel that detects obstacles from the tip of the cane to the target, up to a range of 1.5 m or 3.5 m (selected by the user). A DOWN channel was also included to detect drop-offs in front of the user. Once an obstacle is detected, the device emits audio signals from which the user can determine distance to and direction of the detected obstacle. However, the device must be swept, like the white cane, and it merely detects obstacles without providing any real guidance or positional information.

Variations of sonic and ultra-sonic travel aid devices have been made commercially available. An obstacle sensing cane, similar to the laser device mentioned above, comprised a cane having an ultrasonic sensor mounted to the cane for detecting obstacles. Once an obstacle was detected, an audible sound was issued indicating so. Another example is the Mowat sensor. The Mowat sensor is a hand-held ultrasonic-based device that informs the user of the distance to detected objects by means of tactile vibrations. The frequency of the vibrations is inversely proportional to the distance between the sensor and the object. The Mowat sensor is a secondary aid, while the primary one remains a long cane or a guide dog. Still another example is the Biaural Sonic Aid, commercially known as the Sonicguide™. The Sonicguide™ is in the form of a pair of spectacle frames, with one ultrasonic wide-beam transmitter mounted between the spectacle lenses and one receiver on each side of the transmitter. Signals from the receivers are frequency shifted and presented separately to the left and right ear of the user. The resulting interaural amplitude difference allows the user to determine the direction of an incident echo and thus of an obstacle. The distance to an object is encoded in the frequency of the demodulated low-frequency tone. This device is also considered a secondary device, since it is unsuited to detect low-lying objects, and is used in conjunction with a long cane or guide dog.

The NavBelt™, developed in 1989, is a portable device equipped with ultrasonic sensors and a computer, which tries to apply mobile robot obstacle avoidance technologies to assistive devices for the handicapped. The device is carried similar to a hiker's backpack. This system generates directional audio cues that are meant to guide a blind pedestrian among densely cluttered obstacles.

Other devices include the Nottingham Obstacle Detector, which is a hand-held sonar device that provides an auditory feedback that indicates eight discrete levels of distance by different musical tones, the Russell Pathsounder, which provides three discrete levels of feedback (series of clicks), coarsely indicating distances to an object using two ultrasonic transducers mounted on a board that the user wears around the neck at chest height and the Electronic audio aid, which emits a directional audio signal which is reflected back to the user by nearby obstacles which the user uses to determine the direction to obstacles.

The above mentioned sonic and ultrasonic devices fail to solve many of the problems cited above regarding the white cane. The user of these devices must again be specifically trained to operate the devices. Furthermore, operation requires significant effort and concentration. The above mentioned devices also usually do not supply any guidance or position information.

In recent years, researchers have shifted their attention toward global navigation aids (GNAs) for the purpose of orientation and direction. Unlike the devices discussed above, GNAs are not concerned with local obstacle avoidance, but rather with globally directing the traveler to a desired location. In one system, appropriately called Talking Signs, transceivers are installed in the vicinity of regular orientations signs (for sighted people). Blind travelers make use of a hand-held receiver that receives spoken messages from the fixed transceivers via an infrared light beam. The receiver then demodulates the message and voices it for the traveler (e.g., "Corner of Webster and Clay Streets").

Another GNA system employs a very simple global path recording device. While in learning mode, the device records a certain path with the help of a pedometer with directional changes being recorded manually (only as right-angle turns). In playback mode, the device guides the user through the previously recorded sequence by providing coded audible signals indicating turns and directions.

The above listed GNA devices all provide some degree of position feedback but seem uninterested in obstacle detection. Another problem is that all the above devices are based on acoustic feedback which interferes with the blind person's ability to pick up environmental cues through hearing.

Thus, there is a need for an improved travel aid for visually impaired people. There is a further need for an improved travel aid which automatically scans a wide area around the user both at ground level and above. There is a still further need for an improved travel aid which can actively and intuitively guide a user without requiring extensive training to use or extensive concentration to operate. There is also a need for a travel aid which can not only detect obstacles, but can also indicate an optimum path around an obstacle without losing the user's orientation or direction. There is still another need for a travel aid which can guide a user to a predetermined point or provide position or orientation information to the user.

SUMMARY OF THE INVENTION

The present invention provides a user-driven, active guidance system for guiding visually impaired users through obstacle filled routes of travel. The system includes an obstacle detection system which detects the distance to and location of obstacles and a controller for receiving obstacle data and determining an optimum path around the obstacle so as to return the user back to the original path of travel without losing orientation or direction. The system provides active guidance by exerting physical force upon the user to intuitively direct the user around the obstacle.

One object of the present invention is to provide an improved travel aid for visually impaired people.

Another object of the present invention is to provide an improved travel aid which automatically scans a wide area around the user both at ground level and above.

Still another object of the present invention is to provide an improved travel aid which can actively and intuitively guide a user without requiring extensive training to use or extensive concentration to operate.

A further object of the present invention is to provide a travel aid which can not only detect obstacles, but can also indicate an optimum path around an obstacle without losing the user's orientation or direction.

A still further object of the present invention is to provide a travel aid which can guide a user to a predetermined point or provide position or orientation information to the user.

In order to achieve the foregoing objects, the user-driven, active guidance system of the present invention comprises a frame having a cane-like handle. The frame rides on a wheel assembly that supports the frame's weight during regular operation. The system is driven by the user's motion in a desired direction. The wheel assembly is configured to be rotatable around a steering axis. Sensor means, such as an array of ultrasonic sensors in the preferred embodiment, are provided for detecting the distance to and location of obstacles. A system controller determines the optimum path around any detected obstacles and controls the operation of a steering means, such as a small servo motor, which steers the system around the obstacle by rotating the wheel assembly.

The rotation of the wheel assembly by the steering means causes the system to exert a physical force upon a user indicative of the path around the obstacle. The user's intuition is to follow the system on the path around the obstacle. It requires little or no training before a user is comfortable using the system. Furthermore, it takes very little concentration on the part of the user to operate the system.

The system can be configured such that the controller determines a path around a detected obstacle which will place the user back in the same direction and orientation of travel prior to encountering the obstacle. Alternative embodiments of the invention include a joystick on the handle with which the user can indicate a desired direction of travel. A degree of user determination can also be signaled by persisting to indicate a direction of travel toward an obstacle, after the system has detected an obstacle. This can be useful in situations where the user believes there to be a false obstacle detection, such as a door which can be opened.

Other embodiments can include a compass and wheel encoders for measuring the distance and direction of travel. Voice recognition and synthesis hardware can be added to receive and transmit voice commands. Position and orientation information can also be transmitted via the voice synthesis hardware. A gyroscope can be added to detect possible error conditions caused by the system traveling over small obstacles. In one alternative embodiment, memory means are included which store the position of desired locations. Through a positional guidance system, such as a Global Positioning System (GPS), the system can automatically guide the user to predetermined locations stored in the memory means.

Further objects, features, and advantages of the invention will become apparent from a consideration of the following description and the appended claims when taken in connection with the accompanying drawings.

DETAILED DESCRIPTION OF THE PREFERRED EMBODIMENT

Preferred embodiments of the user-driven, active guidance system are described herebelow with reference to the drawings.

Figure 1:
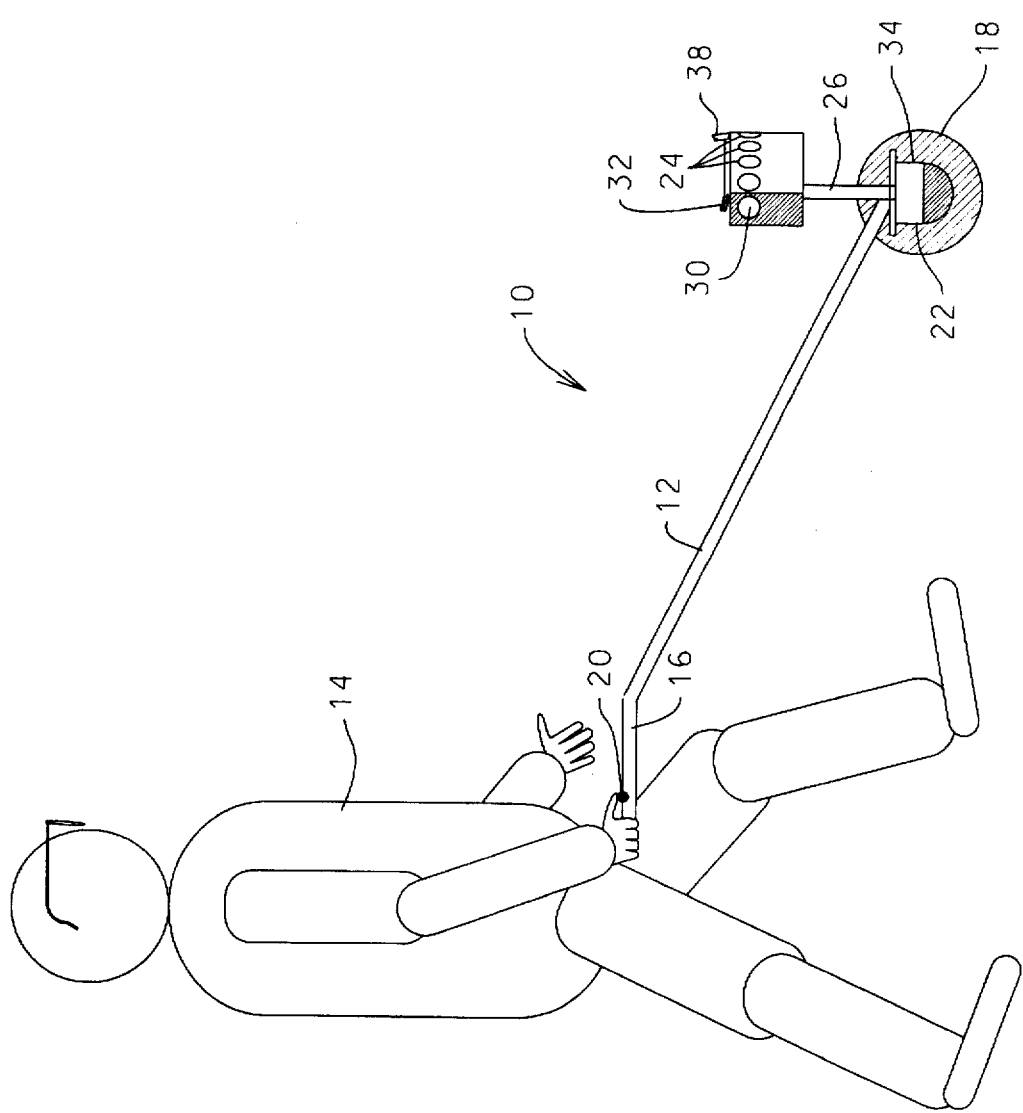
FIG. 1 is a schematic side-view diagram of a user using the user-driven, active guidance system of the present invention.
Figure 2:
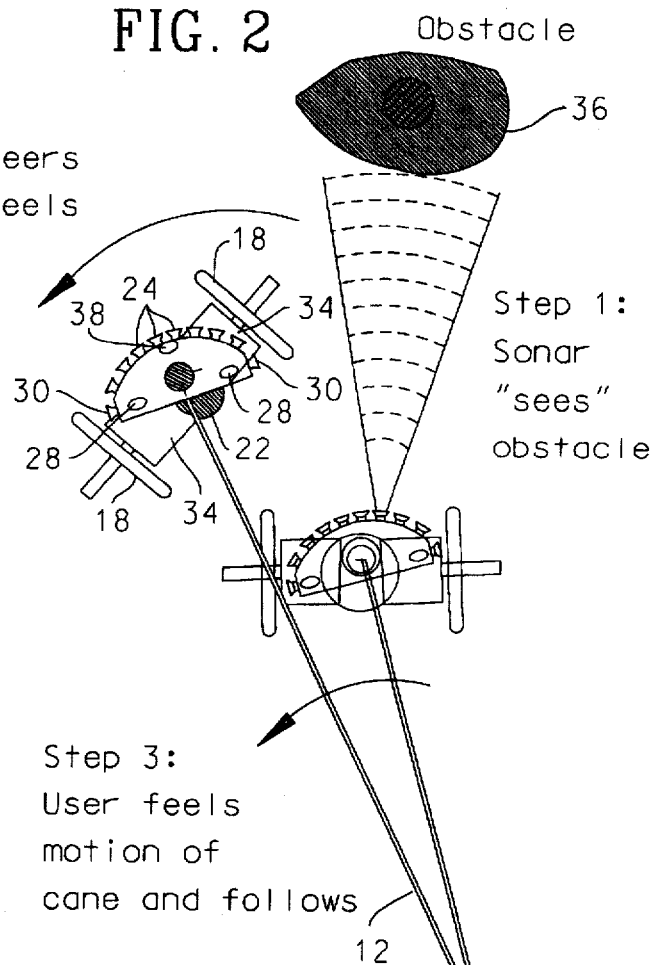
FIG. 2 is a schematic top-view diagram of the guidance system of FIG. 1 showing the system recognizing and avoiding an obstacle.
Figure 2:
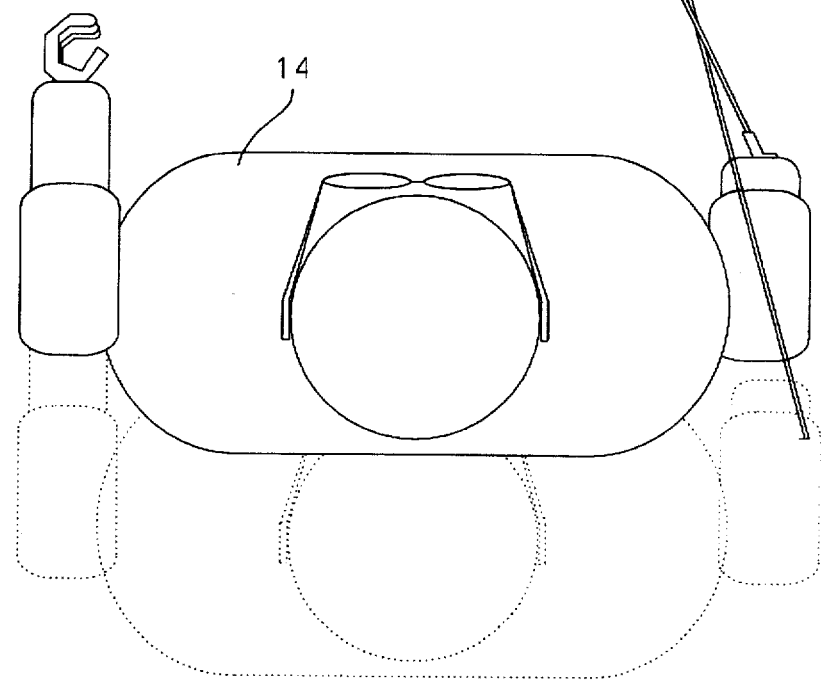
Figure 3:
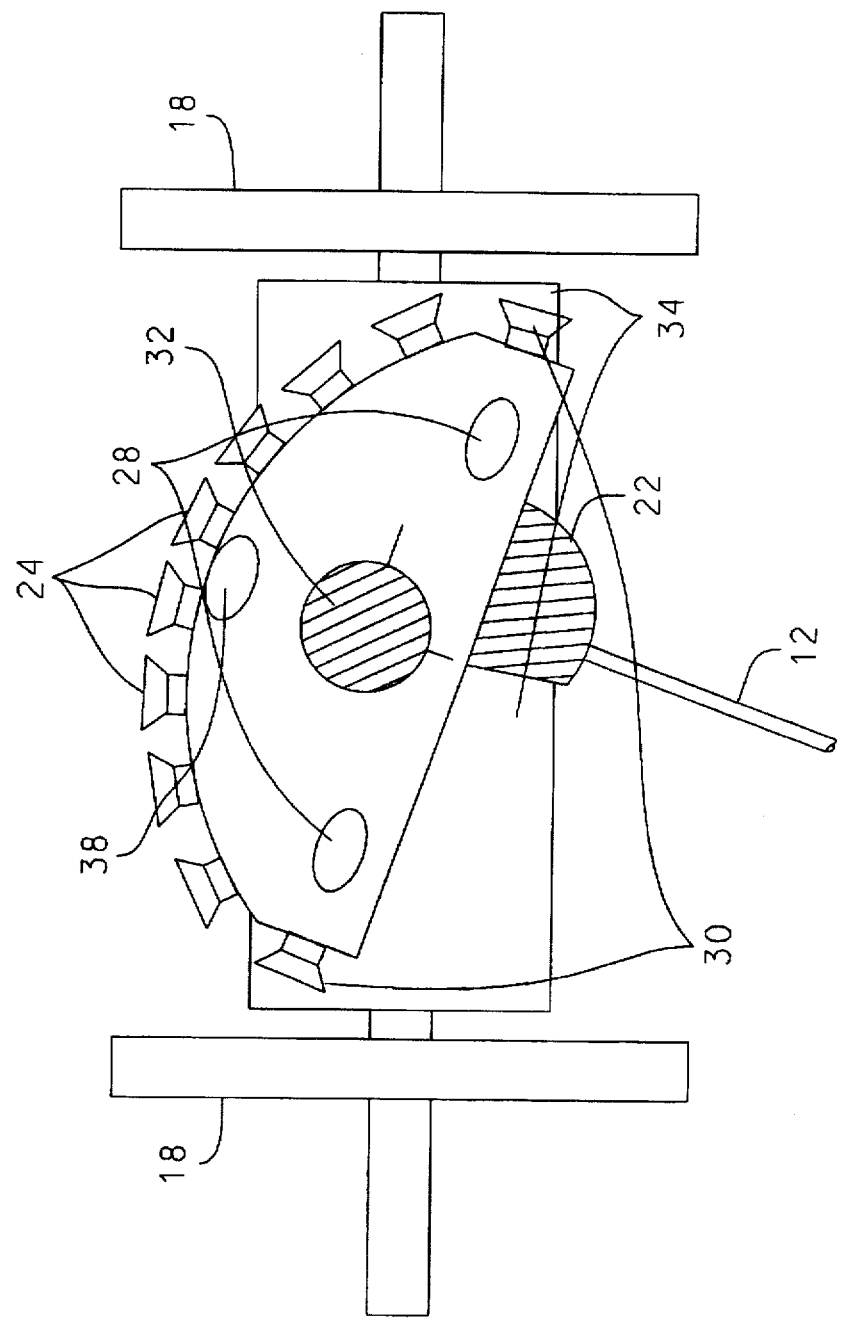
FIG. 3 is an exploded schematic top-view diagram of the base of the guidance system of FIG. 1.

Referring to FIGS. 1-3, the user-driven, active guidance system, indicated generally at 10, includes a cane 12, configured to be held by a user 14. Much like the widely used white cane, the user holds the handle 16 of the cane 12 in front of him/her while walking. The system 10 rolls on wheels 18 that support its weight during regular operation. A thumb operated mini-joystick 20 is located on the handle 16 and can be used by the user 14 for directional control or to indicate a level of determination about traveling in a certain direction. A steering servo motor 22, operating under the control of a built-in computer (not shown), can steer the guide wheels 18 left and right, relative to the cane 12. An array of ultrasonic sensors 24 is mounted in a semi-circular fashion above the guide wheels 18. The sensors 24 are mounted to the cane 12 using a sensor mount 26. Additional sensors can be used facing upward 28 and sideways 30 to detect above ground level obstacles and for wall following respectively. A fluxgate compass 32 (i.e., an electronically operated and read compass) can also be mounted above the guide wheels 18. Attached to each guide wheel 18 is an incremental encoder 34. The built-in computer uses data from these encoders 34 and from the fluxgate compass 32 to compute the relative motion of the user 14, as well as the momentary travel speed.

During operation, the user 14 holds the handle 16 in one hand, so that the guide wheels 18 contact the ground right in front of the user 14 (possibly offset slightly to the side of the hand that holds the cane 12). The user 14 prescribes a desired direction of motion with the miniature joystick 20. This direction command is understood to be relative to the current absolute direction read off the fluxgate compass 32. For example, if the compass 32 is facing straight north and the user 14 indicates the direction to be "forward" (by pushing the joystick 20 forward), then the system 10 would lock into "straight north" as the desired direction of travel and the steering servo 22 would steer the guide wheels 18 so that the compass 32 is always facing north. As another example, let us consider the case where the user 14 indicated "right" as the desired direction of travel. Then the computer would add 90° to the current direction of travel (say, north) and the steering servo 22 would steer the guide wheels 18 to the right until the compass 32 was facing east.

While traveling, the ultrasonic sensors 24 detect any obstacle in a 120° wide sector ahead of the user 14. Advanced obstacle avoidance techniques, developed originally for mobile robots and described in U.S. Pat. No. 5,006,988, issued on Apr. 9, 1991 and U.S. Pat. No. 5,239,515, issued on Aug. 24, 1993, both incorporated herein by reference, are implemented to determine an optimal direction of travel even among densely cluttered obstacles. Prior art travel aids merely inform the user of the existence of obstacles and the users must find their way around the obstacle and toward the desired target on their own. For example, if the present system 10 was "locked" into a desired travel direction of north, but an obstacle 36 blocked the way (see step 1, FIG. 2), then the obstacle avoidance algorithm would prescribe an alternative direction that would clear the obstacle but would be facing north as close as possible (see step 2, in FIG. 2). Once the guide wheels 18 begin to move sideways to avoid the obstacle 36, the user 14 feels the resulting horizontal rotation of the cane 12 (see step 3, FIG. 2). In a fully intuitive (i.e., there is virtually no training time required) response, the user 14 changes his/her orientation to align him/herself with the cane 12 at the "nominal" angle. In practice, the user's walking trajectory follows the trajectory of the guide wheels 18 similar to the way a trailer follows a truck. Once the obstacle 36 is cleared, the steering servo 22 steers the guide wheels 18 back to the original desired direction of travel. The new line of travel will be offset from the original line of travel. Depending on the circumstances, the user 14 may wish to continue walking along this new line of travel, or the system 10 can be programmed to return to the original line of travel. This latter option is made possible by the full odometry capability provided by the guide wheels 18 and their attached encoders 34.

Figure 4:
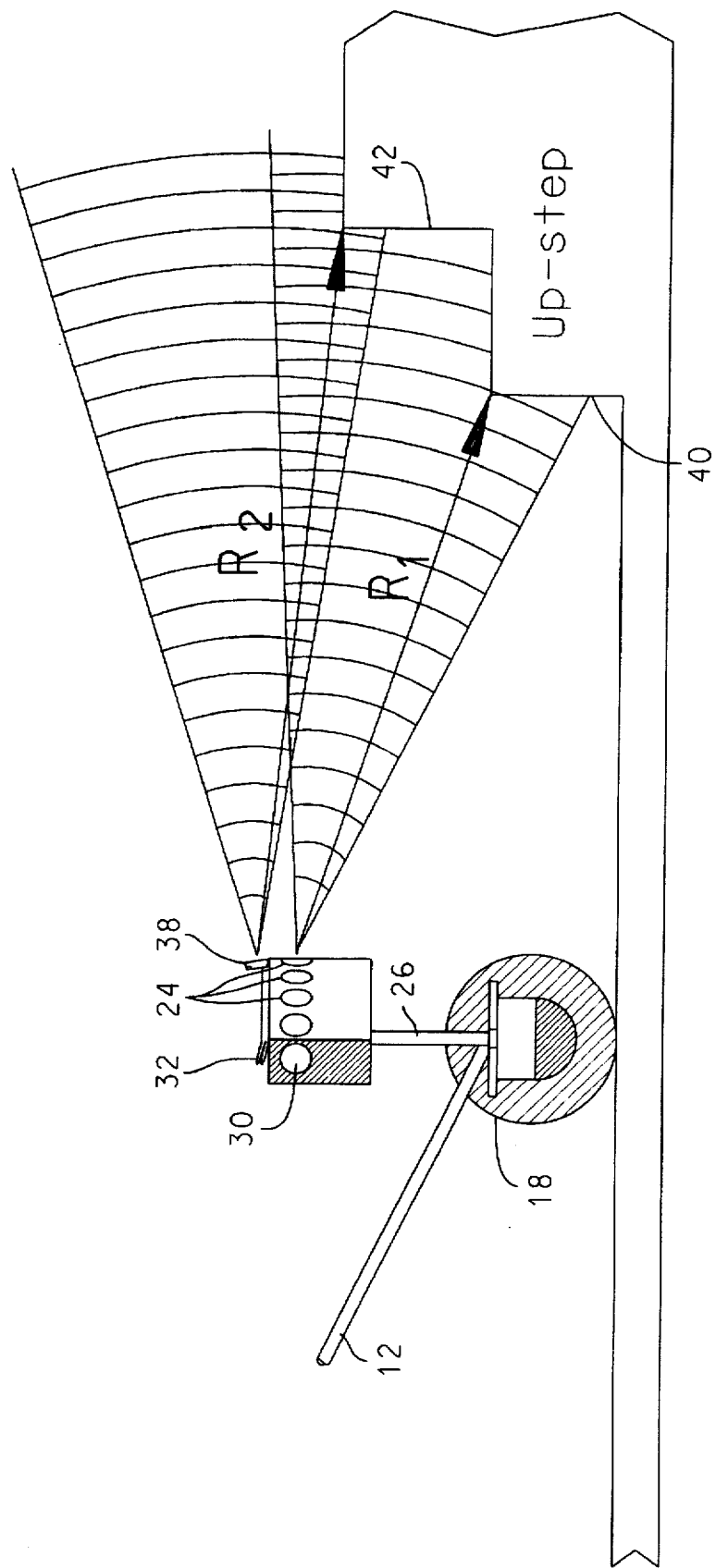
FIG. 4 is a partial schematic side-view of the guidance system of FIG. 1 showing the system addressing an up-step.

One particularly difficult problem for the user 14 is that of stairs. The present invention offers separate solutions for down-steps and up-steps. Down-steps are detected in a fail safe manner: when a down-step is encountered, the wheels 18 of the system 10 drop off the edge—without a doubt a signal that the user 14 can't miss. Up-steps are potentially more difficult to detect. As shown in FIG. 4, the height of the main array of front-facing sensors 24 is such that the first step 40 of the upstep is detected just like an obstacle. However, higher up on the system 10 and mounted at a different angle is one additional sensor 38, called the "forward-up" facing sensor. This sensor 38 "looks" above the bottom step 40 and detects the presence of the second step 42 at a distance $R_2$. The difference between $R_2$ and $R_1$ is computed and, if it meets a pre-programmed criterium for stairs, the system 10 identifies the object as stairs and either signals the user 14 or allows the system 10 to bump the bottom step 40 at which point the user 14 will lift the system 10 up the stairs. If $R_2$ and $R_1$ are almost equal, then the object is treated as a wall. If $R_2$ is much larger than $R_1$, then the system 10 interprets the object as an obstacle that needs to be avoided.

Prior art navigation aids are designed to notify the user of obstacles using sounds, vibration or verbal cues to indicate the presence of obstacles (usually requiring the user to perform some sort of scanning action). Then, the user must evaluate all of the obstacle information, which usually includes the size and proximity of each obstacle, and decide on a suitable travel direction. In sighted people (or in animals), such relatively high bandwidth information is processed almost reflexively, usually without the need for conscious decisions. Nature had millions of years to perfect this skill. However, the evaluation of obstacle information presented acoustically is a new skill that must be acquired over hundreds of hours of learning. Even then, exercising such a skill will take a great deal of conscious effort, and thus processing time. Indeed, the system may fail altogether if the user is unfocused or doesn't pay attention to the signals. The required effort further increases with the number of obstacles found.

The present invention is fundamentally different from other devices in that it "views" the environment and computes the momentary optimal direction of travel. The resulting guidance signal is a single piece of information, a direction, which means that the bandwidth of the information is much smaller. Furthermore, the present invention transfers the direction information through direct physical force. This active guidance by exerting physical force upon the user intuitively directs the user around the obstacle. The consequence is that it is far easier, safer, and faster to follow the intuitive, low-bandwidth, active, guidance signal of the present invention than to follow the high-bandwidth information of other existing systems.

The result is that any subject can immediately follow the present invention at walking speed and among densely cluttered obstacles. The physical guidance of the present invention requires neither training nor attention. If the user 14 fails to react to an avoidance maneuver initiated by the present invention, then the physical force exerted on the user 14 increases, almost to the point where the user cannot continue to walk. This is accomplished without the need for drive motors and associated heavy power equipment. The present invention uses the motion of the user 14 for power, and redirects that motion with a low-power steering servo 22 that needs to overcome only the internal friction of the steering mechanism, and only during avoidance maneuvers. Indeed, there are two different forces, a moment due to horizontal rotation of the handle 16 and a change in resistance to pushing the system 10, that the present invention exerts on the user 14. Both forces are completely intuitive, which means that any user 14 can use the system 10 immediately and without learning how to interpret artificially defined acoustics of tactile signals. Furthermore, yielding to external forces is a reflexive process that does not require a conscious effort.

The moment due to horizontal rotation of the handle 16 can be best described as the resulting rotation of the handle 16 in response to a change of direction of the system 10. Even though the present invention is basically unpowered, it can apply a substantial amount of physical force on the user 14 if the user 14 fails to respond to a change of direction prescribed by the device. This force is the result of a sideways motion of the guide wheels 18 when avoiding an obstacle. The resulting rotation of the handle 16 forces a clearly noticeable rotation of the users hand that holds the proxal end of the handle 16.

The change in resistance to pushing the cane 12, immediately noticeable after the guide wheels 18 change their orientation (but even before the user 14 feels the rotation of the cane 12), is the increased reaction force that is opposed to pushing the cane 12 forward. We will not analyze this force in detail but in essence it can be understood as follows: When walking while the cane 12 and the guide wheels 18 are perfectly aligned, the user 14 must only overcome the reactive force resulting from the friction in the bearings and the roll resistance of the wheels 18. Let's say this force was equivalent to one pound. Now, suppose the guide wheels 18 steered 60° in either direction. Then the user 14 would have to push the cane 12 with a force of 1/cos 60°=2 pounds in order to overcome the one pound reactive force of the guide wheels 18. This change in reactive force is immediately felt by the user 14 and prepares him/her immediately for an upcoming steering maneuver.

Alternative embodiments of the present invention can be further enhanced by a variety of other advanced features. For example, the system can be equipped with a Global Positioning System (GPS). Outdoors, commercially available GPSs can provide global positioning information. This makes it possible for the user 14 to prescribe a desired target location (for example, the supermarket or the post office) to the system 10 and have the system 10 automatically guide the user 14 to that location. Alternatively, the system 10 could learn a desired path by recording path segments during an initial "lead-through" run with a sighted person. Indoors, where GPS is not effective, the same path programming or lead-through techniques can be used to have the system 10 automatically guide the user 14 to a desired location, using dead-reckoning based on encoder 34 and compass 32 readings.

Wall following may also be accomplished. Many indoor travel tasks take place in long corridors. Wall following can be implemented easily, using the two sideways facing sensors 30 for navigation. This would allow the user 14 to travel on a path down the center of the corridor away from doors or other obstacles which may be opened or placed in the user's path as the user 14 traverses the corridor.

Speech input/output can also be added to the present invention. A large variety of functions can be implemented with the help of speech output and/or input modules attached to the onboard computer. For example, one useful function could be the instant presentation of exact location and orientation data.

It is to be understood that the invention is not limited to the exact construction illustrated and described above, but that various changes and modifications may be made without departing from the spirit and scope of the invention as defined in the following claims.

We claim:

1. A user-driven, active guidance system for guiding a user through a field of operation having obstacles thereon, said system comprising:

sensor means for detecting an obstacle and for generating an obstacle indication signal indicative of a position of said obstacle;

a controller coupled to said sensor means for receiving said obstacle, indication signal, determining a path around said obstacle and generating a steering signal indicative of said path around said obstacle;

a frame having a handle portion adaptable to be held by the user;

a wheel assembly having a wheel configured such that motion provided by the user is used to drive the system, said wheel assembly being operably connected to said frame and being rotatable around a steering axis;

steering means coupled to said controller for receiving said steering signal and operably connected to said wheel assembly for rotating said wheel assembly about said steering axis in response to said steering signal in order to guide said system along said path around said obstacle;

the system being configured such that rotation of said wheel assembly causes said handle portion of said frame to exert a force on the user indicative of said path around said obstacle.

2. The system of claim 1 wherein said sensor means comprises an array of ultrasonic sensors configured to send and receive ultrasonic signals.

3. The system of claim 1 wherein said controller comprises a microprocessor adapted to run software algorithms for processing said obstacle indication signal to determine said path around said obstacle.

4. The system of claim 1 wherein said steering means comprises a servo motor.

5. The system of claim 1 further comprising a compass coupled to said controller for providing said controller with directional information.

6. The system of claim 1 further comprising a wheel encoder coupled to said wheel and said controller for measuring distance information indicative of a distance traveled by said wheel and providing said distance information to said controller.

7. The system of claim 1 further comprising a joystick mounted on said handle portion and coupled to said controller, said joystick configured to allow the user to indicate a desired direction of travel by moving said joystick in said desired direction of travel, wherein said controller controls said steering means to steer said system in said desired direction of travel.

8. The system of claim 7 wherein said controller is configured to recognize a user override of said steering signal, wherein the user indicates said override by continuing to indicate a desired direction of travel different than along said path around said obstacle.

9. The system of claim 2 further comprising a forward-up sensor operably connected to said frame above said array of ultrasonic sensors at a different angle, with respect to the ground, than said array of ultrasonic sensors and coupled to said controller, said forward-up sensor being configured to detect the presence of a step and generate a step signal to be sent to said controller, said controller being configured to suppress said steering signal in response to said step signal.

10. The system of claim I further comprising a wall sensor operably connected to said frame, aimed in a direction perpendicular to said handle portion, and coupled to said controller, said wall sensor for detecting the presence of a wall adjacent to said system, said controller configured to control said steering means to steer said system in a path along said wall.

11. The system of claim 1 further comprising memory means coupled to said controller, said memory means for storing directional instructions for predetermined locations, said controller configured to recall, upon instruction from the user, instructions for a selected location and to control said steering means to guide the user to said selected location.

12. The system of claim 1 further comprising a global positioning system for determining location and orientation data of said user.

13. The system of claim 12 further comprising memory means coupled to said controller, said memory means for storing coordinates for predetermined locations, said controller configured to recall, upon instruction from the user, a selected location and to control said steering means to guide the user to said selected location using said global positioning system.

14. The system of claim 12 further comprising output means for indicating said location and orientation data.

15. The system of claim 14 wherein said output means comprises speech output means for outputting said location and orientation data as a synthesized voice signal.

16. The system of claim 1 further comprising speech input means coupled to said controller, said speech input means for inputting spoken commands into said controller.

17. A user-driven guidance system for guiding a user through a field of operation having obstacles thereon, said system comprising:

- an array of ultrasonic sensors configured to send and receive ultrasonic signals for detecting an obstacle and to generate an obstacle indication signal indicative of a position of said obstacle;
- a microprocessor coupled to said array of ultrasonic sensors for receiving said obstacle indication signal, said microprocessor adapted to run software algorithms for processing said obstacle indication signal to determine a path around said obstacle and for generating a steering signal indicative of said path around said obstacle;
- a cane having a handle portion adaptable to be held by the user;
- a wheel assembly operably connected to said cane and rotatable about a steering axis, said wheel assembly having a pair of wheels configured to rotate about a rotation axis in response to horizontal force applied to said cane by the user;
- steering means coupled to said microprocessor for receiving said steering signal and operably connected to said wheel assembly for rotating said wheel assembly about said steering axis in response to said steering signal in order to guide said system along said path around said obstacle;
- the system being configured such that rotation of said wheel assembly causes said cane to exert a force on the user indicative of said path around said obstacle.

18. The system of claim 17 wherein said steering means comprises a low-power servo motor.

19. The system of claim 17 further comprising a compass coupled to said microprocessor for providing said microprocessor with directional information.

20. The system of claim 17 further comprising a pair of wheel encoders, each encoder coupled to a wheel and said microprocessor for measuring distance information indicative of a distance traveled by each said wheel and providing said distance information to said microprocessor.

21. The system of claim 17 further comprising a joystick mounted on said handle portion and coupled to said microprocessor, said joystick configured to allow the user to indicate a desired direction of travel by moving said joystick in said desired direction of travel, wherein said microprocessor controls said steering means to steer said system in said desired direction of travel.

22. The system of claim 21 wherein said microprocessor is configured to recognize a user override of said steering signal, wherein the user indicates said override by continuing to indicate a desired direction of travel different than along said path around said obstacle.

23. The system of claim 17 further comprising a forward-up sensor operably connected to the system above said array of ultrasonic sensors at a different angle, with respect to the ground, than said array of ultrasonic sensors and coupled to said microprocessor, said forward-up sensor being configured to detect the presence of a step and generate a step signal to be sent to said microprocessor, said microprocessor being configured to suppress said steering signal in response to said step signal.

24. The system of claim 17 further comprising a wall sensor operably connected to said system, aimed in a direction perpendicular to said cane, and coupled to said microprocessor, said wall sensor for detecting the presence of a wall adjacent to said system, said microprocessor configured to control said steering means to steer said system in a path along said wall.

* * * * *

UNITED STATES PATENT AND TRADEMARK OFFICE
CERTIFICATE OF CORRECTION

PATENT NO. : 5,687,136
DATED : November 11, 1997
INVENTOR(S) : Johann Borenstein It is certified that error appears in the above-indentified patent and that said Letters Patent is hereby corrected as shown below:

In the Abstract, Line 12, delete "my" and insert --ray--.

Column 8, Line 58, Claim 10, after "claim" delete "I" and insert --1--.

Signed and Sealed this

Third Day of February, 1998

BRUCE LEHMAN

Attest:

Attesting Officer

Commissioner of Patents and Trademarks